(12) United States Patent
Millegan et al.

(10) Patent No.: US 10,518,180 B2
(45) Date of Patent: Dec. 31, 2019

(54) DIGITAL CONTENT SELECTION MECHANISM BASED ON INDIVIDUAL ALLOTMENTS IN GROUP SETTINGS

(71) Applicant: Disney Enterprises, Inc., Burbank, CA (US)

(72) Inventors: Patrick W. Millegan, Palo Alto, CA (US); Lily Xudan Liu, Mountain View, CA (US); Alif Salim Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 875 days.

(21) Appl. No.: 14/188,451

(22) Filed: Feb. 24, 2014

(65) Prior Publication Data

US 2015/0238876 A1    Aug. 27, 2015

(51) Int. Cl.
| | | |
|---|---|---|
| *A63F 13/87* | (2014.01) | |
| *A63F 13/35* | (2014.01) | |
| *A63F 13/69* | (2014.01) | |
| *G06Q 30/08* | (2012.01) | |

(52) U.S. Cl.
CPC .............. *A63F 13/87* (2014.09); *A63F 13/35* (2014.09); *A63F 13/69* (2014.09); *G06Q 30/08* (2013.01)

(58) Field of Classification Search
CPC .......... A63F 13/35; A63F 13/87; A63F 13/69; G06Q 30/08
USPC ........................................................ 463/42
See application file for complete search history.

(56) References Cited

U.S. PATENT DOCUMENTS

| | | | | |
|---|---|---|---|---|
| 8,719,141 B1* | 5/2014 | Lee | ..................... | G06Q 30/0275 705/14.71 |
| 2001/0032175 A1* | 10/2001 | Holden | .............. | G06Q 30/0601 705/37 |
| 2002/0116315 A1* | 8/2002 | Grey | ....................... | G06Q 30/08 705/37 |
| 2008/0102920 A1* | 5/2008 | Baerlocher | ............. | G07F 17/32 463/20 |
| 2008/0125225 A1* | 5/2008 | Lazaridis | ................ | G07F 17/32 463/41 |
| 2008/0162331 A1* | 7/2008 | Ephrati | .................. | G06Q 40/04 705/37 |
| 2008/0311996 A1* | 12/2008 | Belton | ............... | H04N 7/17318 463/42 |
| 2010/0203971 A1* | 8/2010 | Ealey | ........................ | G06F 9/54 463/42 |

* cited by examiner

*Primary Examiner* — Omkar A Deodhar
*Assistant Examiner* — Wei Lee
(74) *Attorney, Agent, or Firm* — Patterson + Sheridan, LLP

(57) ABSTRACT

Techniques are disclosed which provide an approach for selecting group-based digital content using a market system. An application receives a bid that indicates a selection for a user-configurable feature of a shared online activity and specifies an amount of currency that a corresponding participant is bidding for the selection. The application identifies a selection of the user-configurable feature having a highest total bid and initiates the shared online activity configured according to the user-configurable feature having the highest total bid.

20 Claims, 6 Drawing Sheets

DIGITAL CONTENT SELECTION MECHANISM BASED ON INDIVIDUAL ALLOTMENTS IN GROUP SETTINGS

BACKGROUND

Field of the Invention

Embodiments presented herein provide techniques for selecting group-based digital content using a currency-based marketing system.

Description of the Related Art

Advances in technology allow individuals to interact with one another in groups in a variety of online or virtual contexts. For instance, online gaming connects players all over the world and allows the players to share a game experience, despite being physically separated from each other. Online games allow players to form groups to play cooperatively or competitively. Further, online games often allow a group of players to select content for the entire group to experience, such as maps to play through in the game. Outside of gaming contexts, other online communities or services allow people to interact with one another as a group or require some form of group decision making. For example, an online streaming video service may allow people to watch the same movie on different screens while providing mechanism to communicate with each other.

Typically, to select group content, such as in an online game, each participant is given a vote. Each participant votes on a desired content, and the content that receives a majority of votes is ultimately selected. For example, assume that five players are playing an adventure game online together, and the game presents the players four options of environments to explore. In this setting, the game selects the map receiving the most votes. However, this approach may limit the opportunities to play through a desired map. For example, consider a situation where the group votes in the same manner each time. In this case, the game never selects a map preferred by a minority of participants because the majority vote always prevails. As a result, this approach may result in a less enjoyable experience for some individuals in a group.

SUMMARY

One embodiment presented herein provides a computer implemented method selecting group-based content using a vote currency. The method may generally include receiving a bid from each of a plurality of participants. Each bid indicates a selection for a user-configurable feature of the shared online activity and specifies an amount of currency a corresponding participant is bidding for the selection specified in the bid. This method may further include identifying a winning selection of the user-configurable feature, the winning selection having a highest total bid and initiating the shared online activity configured according to winning selection.

Other aspects of the invention include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
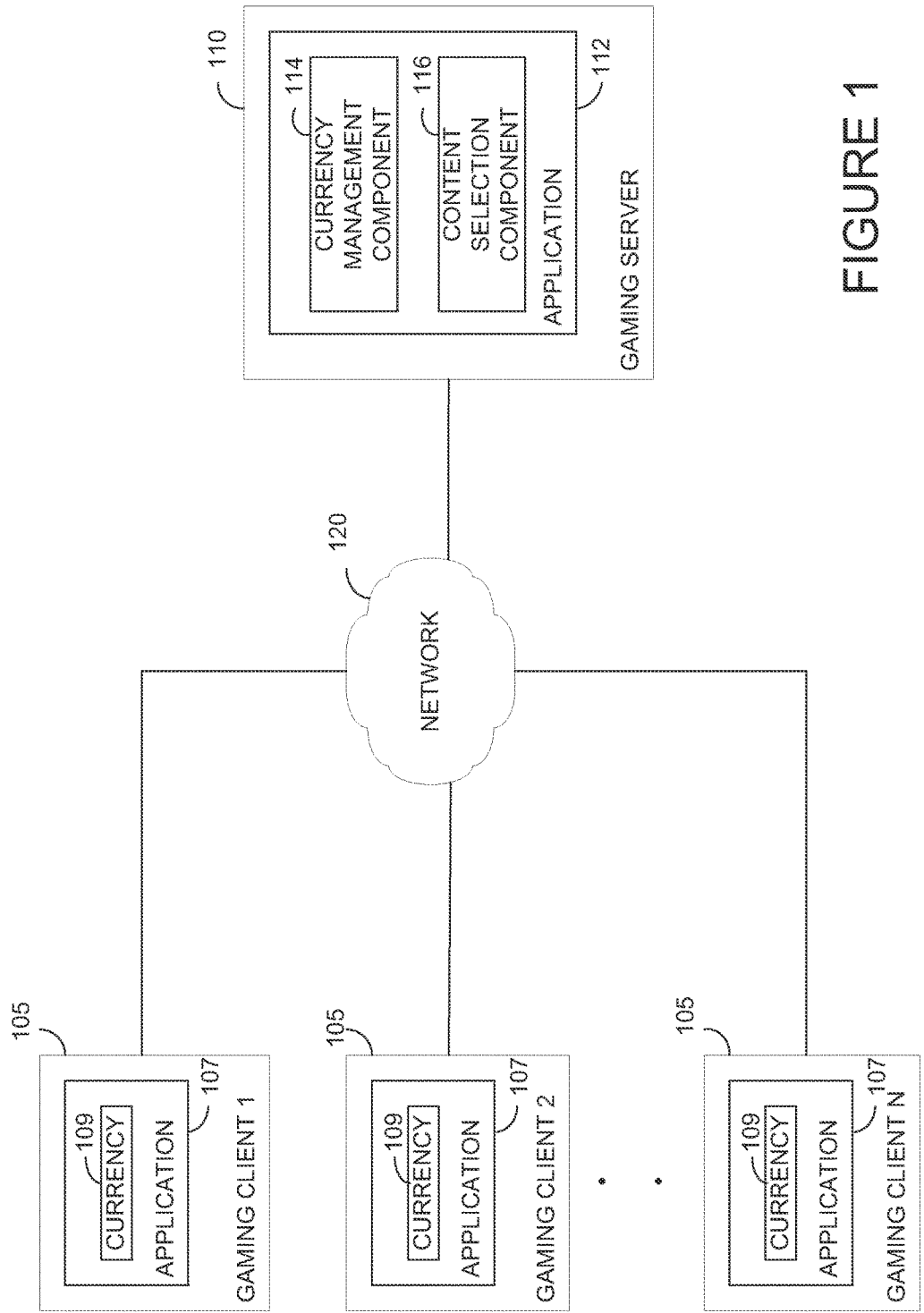
FIG. 1 illustrates an example computing environment, according to one embodiment.

Embodiments disclosed herein provide techniques for selecting group-based digital content using bid currency provided to individuals in a group. Embodiments provide a market system where participants in a group online activity bid on a desired choice based on a bid currency. In one embodiment, a content server presents a group of individuals with options of digital content to select. Each individual votes for desired content by bidding some amount of accrued currency to support their vote. The content server receives a bid from the participants. The content server selects the digital content with the highest bid total. Once selected, the content server deducts the bid amount from each participant that voted for the winning digital content.

The techniques described herein may be applied in a variety of online environments, e.g., multi-player online games, shared media viewing rooms, virtual worlds, etc. In such an environment, players may earn currency by completing in-game tasks, playing the game for a certain period of time, participating in promotions that award bid currency, or purchasing bid currency with actual monetary funds. The players use their earned bid currency to vote on game content, such as in selecting playable maps. That is, the gaming application may receive votes on map options presented to a group of players and select the map which receives the highest total currency bid (rather than based on a highest amount of player votes). Using this approach, players who feel strongly about playing a particular map (or other choice subject to a group decision) may influence the selection of the map by submitting more bid currency than others.

In one embodiment, bids submitted by individuals may be weighted based on user preferences and information about an individual cached over time. Continuing the previous example, the content server may adjust the value of a player's bid using cached information about the player, such as the amount of times the player has prevailed (or not) in previous selections, the total amount of currency possessed by the player, etc. The resulting weight may increase or decrease a total bid for content made by that player.

Because this approach focuses on digital content having the highest bid rather than the highest vote count minority voters have more influence on selection of the content. Further, applying weighted calculations to each vote based on individual histories and preferences may reduce potential for abuse of the bid currency market by individuals. In turn, this approach may help provide an entertaining experience to a group of participants in some shared activity.

The following description relies on an online gaming platform as a reference example for providing a currency-based market system for selecting group-based digital content. However, one of skill in the art will recognize that embodiments are applicable in other contexts selecting digital content as a group. For example, the techniques may be used in a jukebox application in a venue to that allows attendees to select a next song to be played. In this example, the attendees may use obtained bid currency to support their votes for a desired song. As another example, the techniques may also be used in a movie previews application in a movie theater. That is, audience members in the movie theater may use the movie previews application on a mobile phone and use the currency to select a preview to be shown prior to a film screening. Similarly, the techniques may also be applied in a video streaming application that allows people streaming movies through a service to use their currency to vote on a video to watch together.

FIG. 1 illustrates an example computing environment 100, according to one embodiment. The computing environment 100 represents an online gaming platform where multiple gaming clients 105 access, via a network 120, an online game (application 112) hosted by a gaming server 110. The gaming clients 105 include an application 107 used to access and communicate with the gaming server 110. The gaming client 105 may be a physical computing system, mobile device, or a gaming console system. The gaming server 110 may be a physical computing system (e.g., a system in a data center) or a virtual computing instance executing within a computing cloud.

The application 112 itself includes a currency management component 114 and a content selection component 116. The currency management component 114 manages a balance of currency 109 available to gaming clients 105. Participants use currency 109 to influence the selection of digital content by the application 112 among gaming clients 105 playing together in a group. One example of such digital content in the computing environment 100 is playable maps. Gaming clients 105 may acquire currency 109 through several methods. For example, a gaming client 105, upon connecting to the application 112, may receive an initial amount of currency 109. Additionally, currency 109 may be obtained by playing through a map, playing the online game for a specified amount of time, completing in-game tasks, purchasing currency 109 with real-world currency, and so on.

Assume the application 112 prompts a group of gaming clients 105 to select a map to play, e.g., as part of initiating each gaming session. Each gaming client 105 submits a vote for a map and an amount of currency 109. The content selection component 116 evaluates the bids submitted by each gaming client 105 and selects a map having a highest total bid. Once selected, the currency management component 114 deducts an amount of currency 109 from the gaming clients 105 that provided the currency 109 towards the selected map.

In one embodiment, the content selection component 116 may adjust the value a bid submitted by gaming clients 105 based on player profiles associated with each gaming client 105. To do so, the content selection component 116 may interpolate player preferences and cached information about the player accumulated over a time period. Examples of cached information includes whether a player has won a match in previous instances of the online game, whether a player has won a previous selection of a map, a length of play time by the player, an assigned credibility of the user, and so on. The content selection component 116 evaluates the interpolation relative to the currency 109 submitted by the gaming client 105 to calculate a weighted bid amount corresponding to the bid currency 109 submitted by the gaming client 105. This evaluation may be expressed as $$w_i = b_i s_i \qquad (1),$$

where $w_i$ is a weighted bid amount of user i of a gaming client 105, $b_i$ is an amount of currency 109 submitted by the user i, and $s_i$ is a value calculated by the content selection component 116 based on the cached information, user trends, and preferences.

Figure 2:
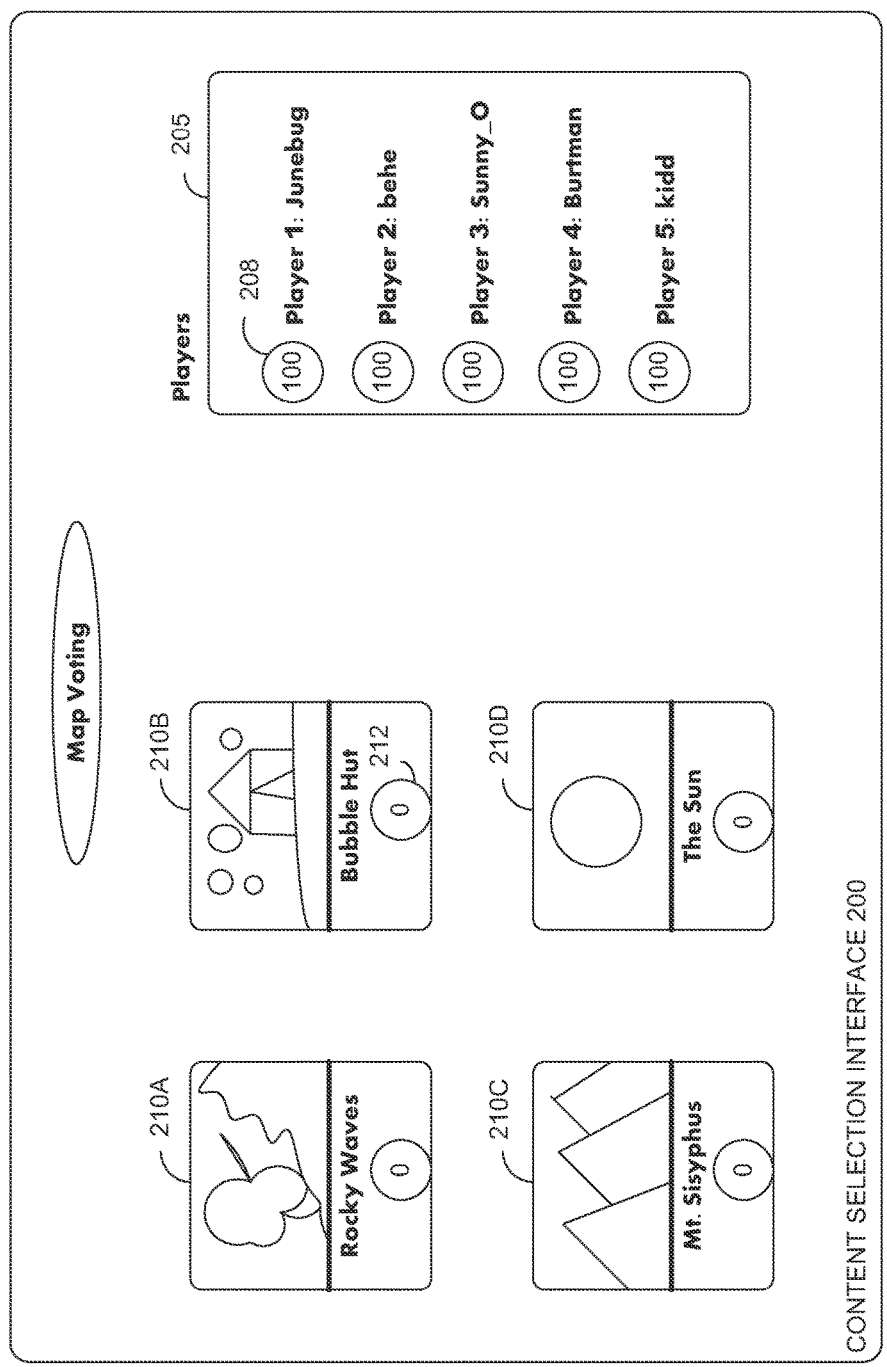
FIG. 2 illustrates an example content selection interface that allows individuals to select content as a group, according to one embodiment.

FIG. 2 illustrates an example content selection interface 200 of the application 112 that allows individuals to select content as a group, according to one embodiment. As shown, the content selection interface 200 includes a list of players 205. The list of players 205 includes the names of each player and an amount of currency 208 associated with the player. Illustratively, the content selection interface 200 presents the players a set of maps 210A-D to select. Each of the maps 210 also provide a total currency field 212, which represents the amount of currency bid towards a map 210 by each of the players.

In one embodiment, each player submits a vote for a preferred map 210. Further, each player also submits an amount of currency 208 to support the vote. The bid total may be reflected on the total currency field 212. After the players submit a bid, the application 112 evaluates the total amount of currency bid for each map 210 and selects the map having the highest bid value.

Figure 3:
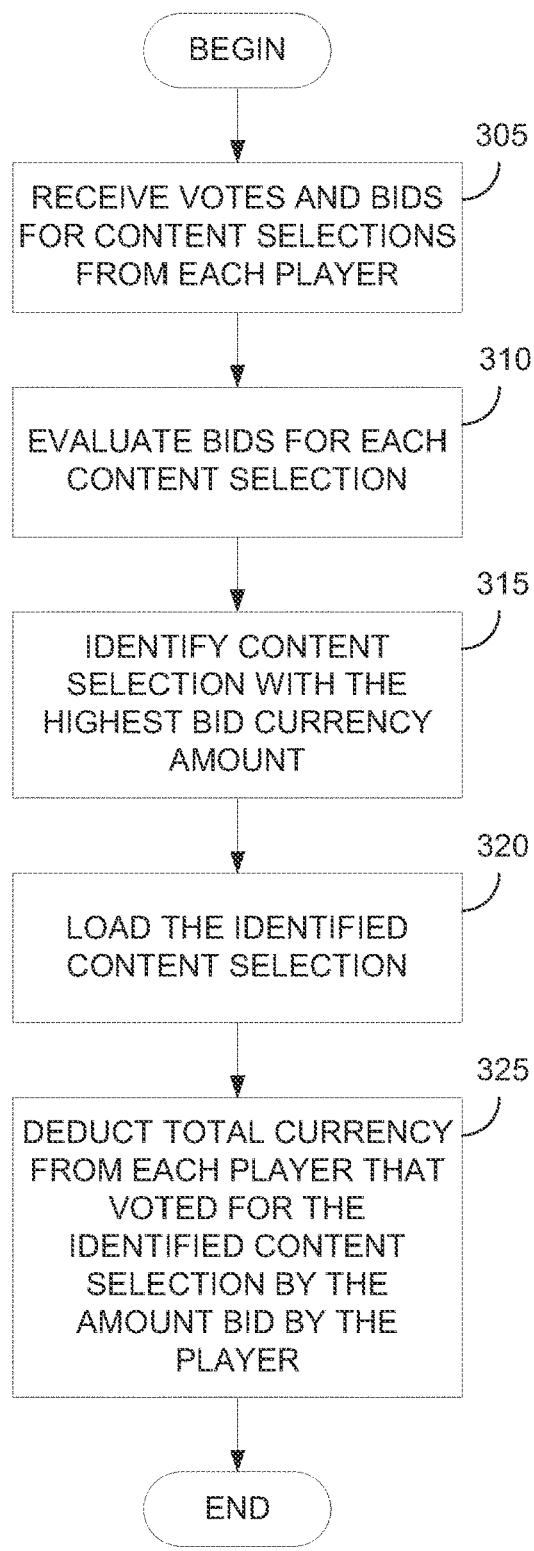
FIG. 3 illustrates a method for selecting group-based content based on bid currency amounts provided by individuals in a group, according to one embodiment.

FIG. 3 illustrates a method 300 for selecting group-based content based on bid currency amounts provided by individuals in a group, according to one embodiment. Assume the application 112 presents choices of playable maps to a group of players. The players, each running a client 105, votes for a playable map and submits an amount of currency to support their vote.

As shown, method 300 begins at step 305, where the application 112 receives the votes and currency bid amounts from each participating gaming client 105. At step 310, the content selection component 116 evaluates the bid currency amounts for each content selection. As stated, the selection component 116 may adjust the value of a bid for a given participant, e.g., based on cached information about the player, in-game trends, and other statistical information. Once evaluated, the content selection component 116 identifies the choice for the shared activity having the highest bid. In the present example, the choice may be which playable map to use for a multiplayer online gaming session. If more than one choice has a highest bid, the content selection component 116 randomly selects among these choices.

At step 320, the content selection component 116 loads the selected map. At step 325, the currency management component 114 deducts the bid amount from each participant who bid for the map selected at step 315. Note, the amount of currency may equal the amount submitted by each gaming client 105, even if the content selection component adjusts the value of bids submitted by the gaming clients 105.

Generally, steps 305-320 operate under the assumption that the initial currency amount maintained by each player is greater than zero. In the event that a player's currency amount reduced to zero at step 325, the application 112 provides the player opportunities to increase the currency to a non-zero value. For example, upon loading the map, the application 112 may automatically provide the user with an amount of currency (or allow the user to purchase in-game and bid currency).

Figure 4:
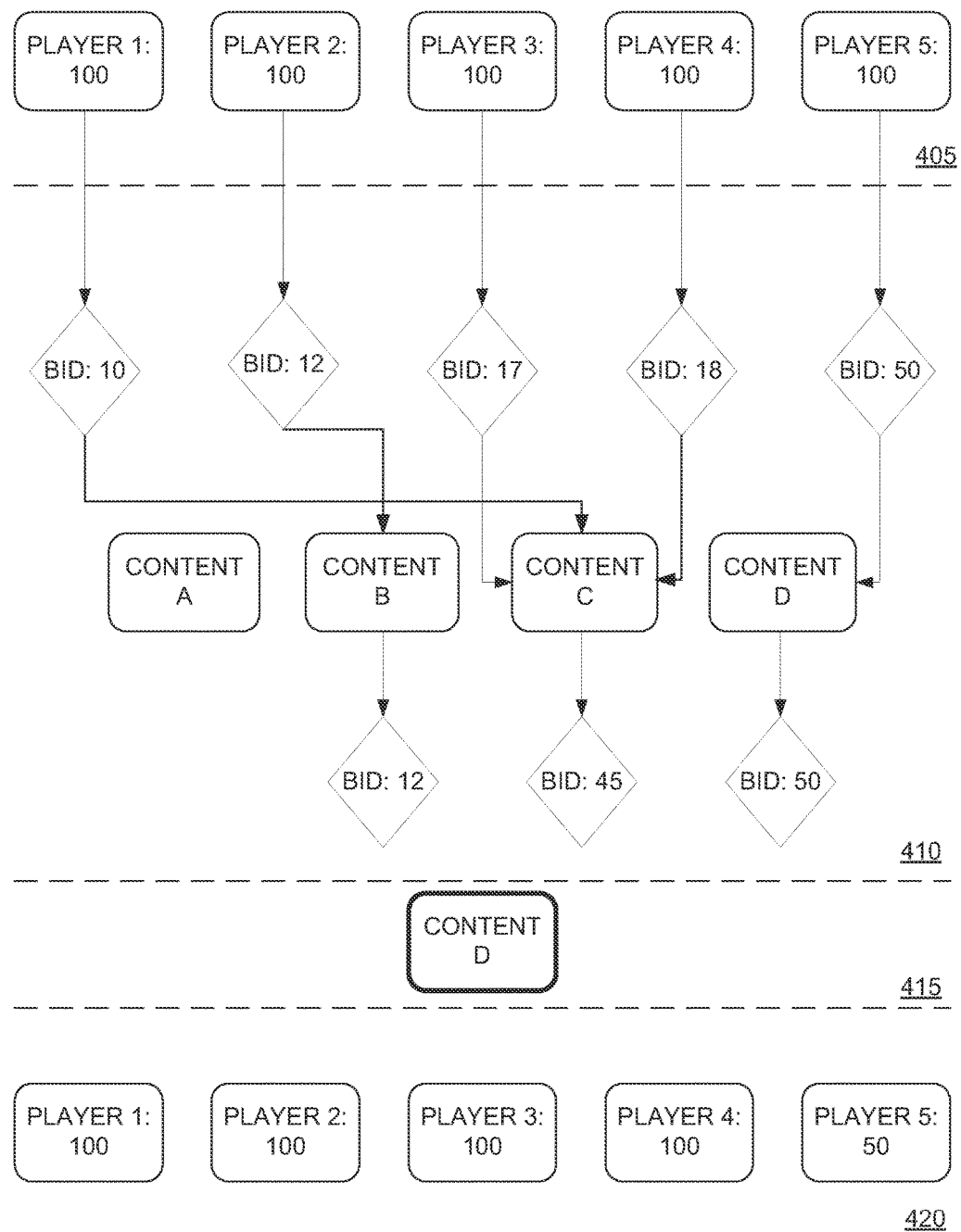
FIG. 4 illustrates an example of individuals selecting a choice as part of participating in an online shared activity using a bidding process, according to one embodiment.

FIG. 4 illustrates an example of individuals selecting a choice as part of participating in an online shared activity using a bidding process, according to one embodiment. In this example, a group of five participants (players 1-5) are bidding for to select content (content A-D) related to a shared activity. Illustratively, players 1-5 each have 100 units of currency to bid for their selection (at 405). At 410, players 1-5 each submit a vote and a bid amount of currency to support their vote. As shown, players 1, 3, and 4 vote for content C. Player 1 bids 10, player 3 bids 17, and player 4 bids 18, resulting in a total bid amount of 45. Further, player 2 submits a vote for content B and bids 10. Player 5 submits a vote for content D and bids 50.

The content selection component 116 determines the highest bid. As shown, content D has a total bid of 50, so the content selection component chooses content D as the winning selection for the group of participants in the shared activity (at 415). Note, although player 5 is the only player out of five players voting for content D, player 5 nevertheless prevails by outbidding the combined bid of players 1, 3, and 4. This approach allows each player to influence the selection outcome by the amount of currency supporting the player vote.

Because player 5 submitted a winning bid (i.e., content D), the currency management component 114 deducts the amount bid (i.e., 50 units) by player 5 after the content selection component 116 chooses Content D (at 420). Note, because the other players 1-4 did not contribute to the selection of Content D, the currency totals of the players remains unaffected.

Figure 5:
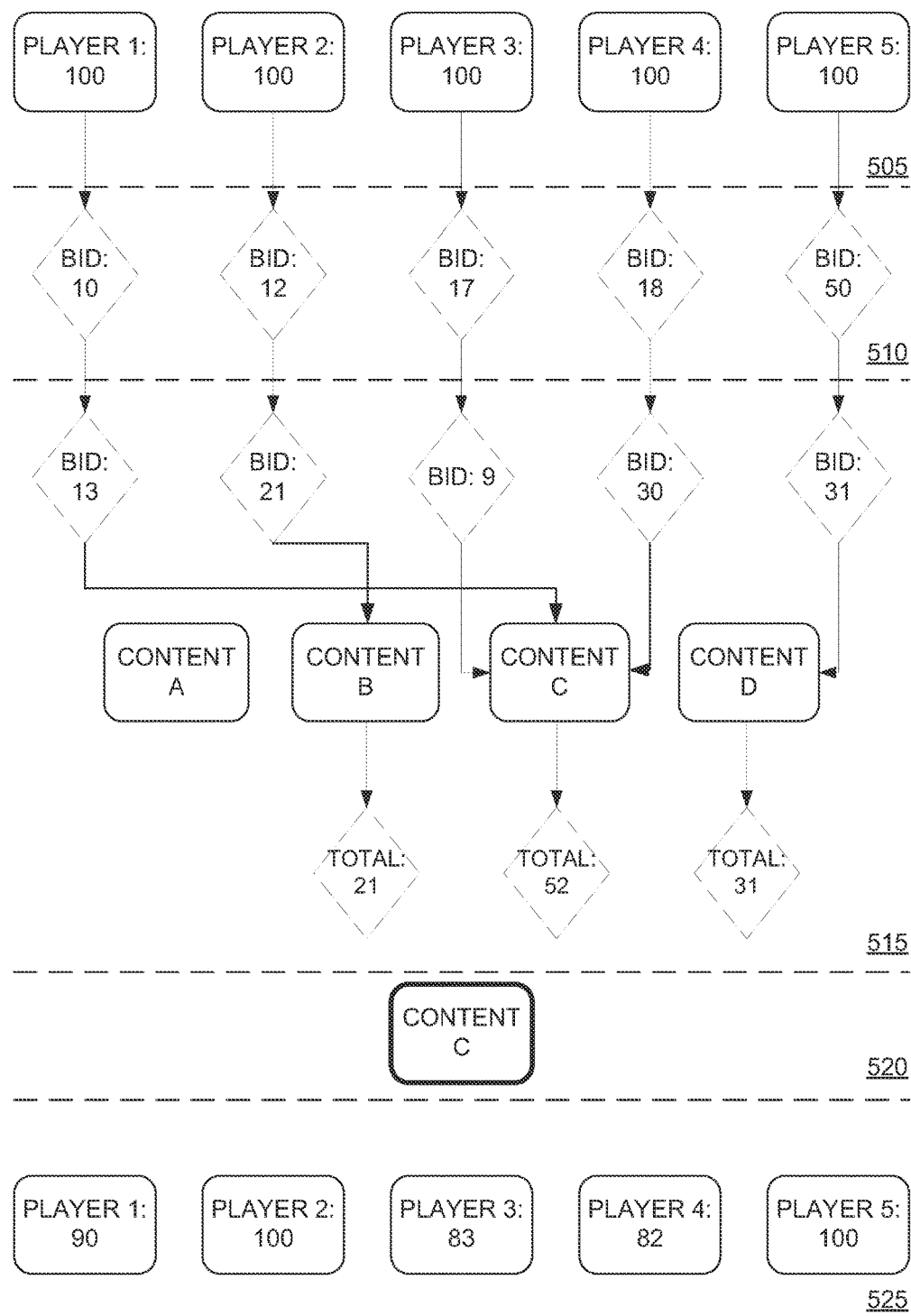
FIG. 5 illustrates an example of individuals selecting a choice as part of participating in an online shared activity using a bidding process, where the bids submitted by each individual are weighted, according to one embodiment.

FIG. 5 illustrates an example of individuals selecting a choice as part of participating in an online shared activity using a bidding process, where the bids submitted by each individual are weighted, according to one embodiment. In this example, a group of five participants (players 1-5) are bidding for a selected choice related to a shared activity (content A-D). Illustratively, players 1-5 each have 100 units of currency to bid for their selection (at 505).

At 510, players 1-5 each submit a vote and a bid amount of currency to support their vote. As shown, players 1, 3, and 4 submit votes for content C. Player 1 bids 10, player 3 bids 17, and player 4 bids 18, resulting in a total bid amount of 45. Further, player 2 submits a vote for content B and bids 10. Player 5 submits a vote for Content D and bids 50.

At 515, the content selection component 116 evaluates the bids submitted by each player. To do so, the content selection component 116 adjusts the value of bids submitted by each player based on player preferences and cached information about the player (e.g., how long the player has been logged into the game, whether the player won a previous match, whether the play won a previous selection, credibility of the player, etc.). The weighted bid currencies of each player are shown at the top of 515. Illustratively, the weighting may increase or decrease the amount of currency submitted by the players.

Once calculated, the content selection component 116 determines which of the bids has the highest amount of currency. In this example, the total amount of currency is 21 for content B, 52 for content C, and 31 for content D. Because content C has the highest amount of currency, the application 112 selects content C (at 520).

Because players 1, 3, and 4 submitted a winning bid for content C, the currency management component 114 deducts the amounts bid by players 1, 3, and 4 (rather than the weighted amounts) after the selection of content C. Note, because the other players 2 and 5 did not contribute to the selection of content C, the currency totals of these players is unaffected.

Figure 6:
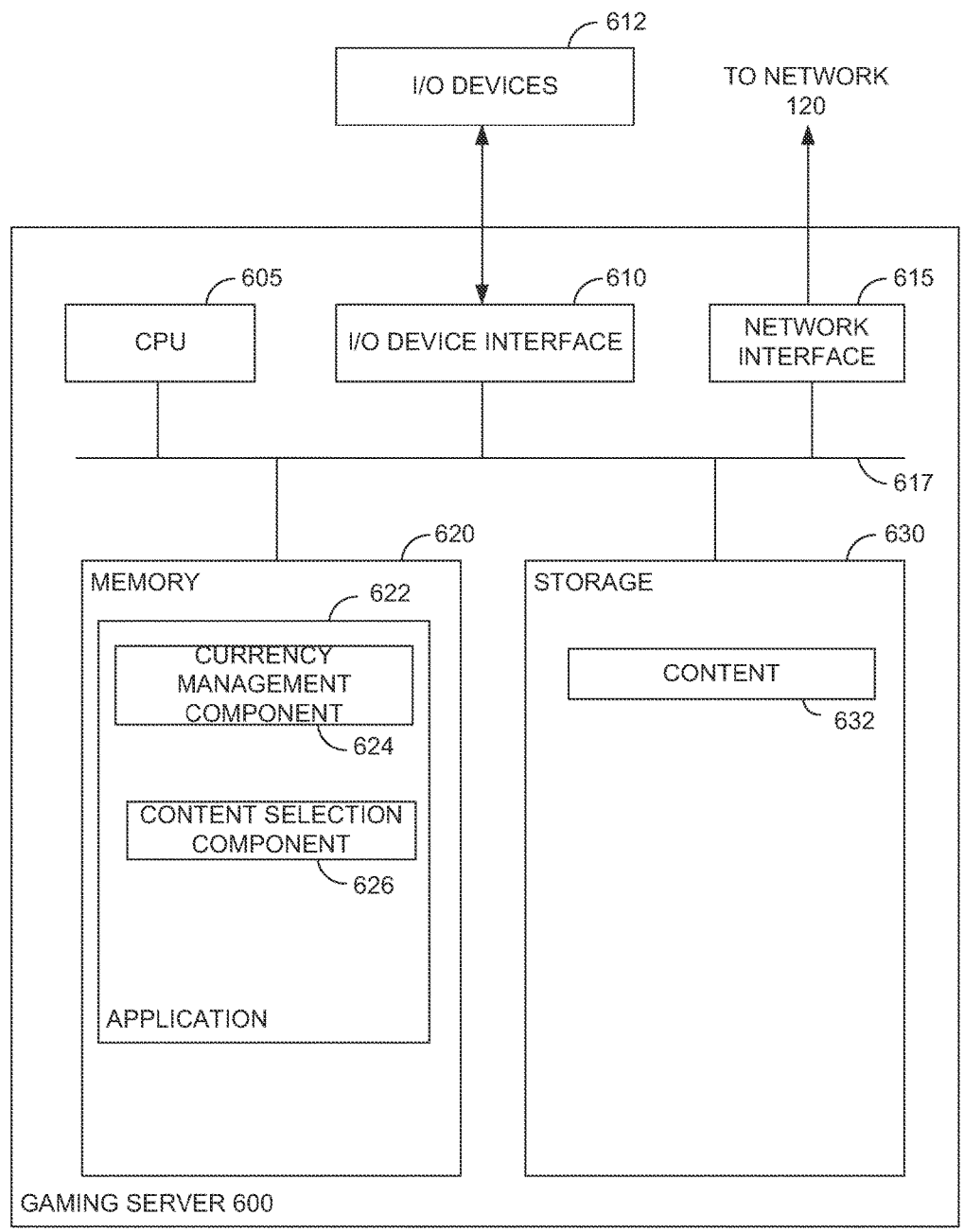
FIG. 6 illustrates a computing server configured to manage bid currency for selecting group-based content, according to one embodiment.

FIG. 6 illustrates a gaming server 600 configured to manage bid currency for selecting group-based content, according to one embodiment. As shown, the system 600 includes a central processing unit (CPU) 605, a network interface 615, an interconnect 617, a memory 620, and storage 630. The gaming server 600 may also include an I/O device interface 610 connecting I/O devices 612 (e.g., keyboard, display and mouse devices) to the gaming server 600.

The CPU 605 retrieves and executes programming instructions stored in the memory 620. Similarly, the CPU 605 stores and retrieves application data residing in the memory 630. The interconnect 617 facilitates transmission, such as of programming instructions and application data, between the CPU 605, I/O device interface 610, storage 630, network interface 615, and memory 620. CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as tape drives, removable memory cards or optical storage, network attached storage (NAS), or a storage area-network (SAN). Further, gaming server 600 is included to be representative of a physical computing system as well as virtual machine instances hosted on a set of underlying physical computing systems. Further still, although shown as a single computing system, one of ordinary skill in the art will recognized that the components of the gaming server 600 shown in FIG. 6 may be distributed across multiple computing systems connected by a data communications network.

As shown, the memory 620 includes an application 622. As noted, the application 622 is an online game accessed by gaming clients. Illustratively, the application 622 itself includes a currency management component 624 and a content selection component 626. The currency management component 624 manages a balance of currency available to gaming participants to bid on choices for a shared activity (e.g., a playable map). The content selection component 626 is configured to evaluate bids by each gaming client and select digital content 632 (shown as stored in the storage 630) based on the amounts of currency. Once a selection is determined, the content selection component 626 retrieves the digital content 632.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for voting on user-configurable features of a shared online activity, the computer-implemented method comprising:
   receiving, from each of a plurality of participants, a distinct number of votes cast for a respective selection for a shared feature of the shared online activity, wherein the shared feature is user-configurable, wherein the shared online activity is provided via a virtual environment of a computer game configured to execute on a server, the computer game including an allotment management component and a content selection component;
   automatically adjusting, by the content selection component, the number of votes cast by at least a first one of the participants, based on one or more attributes of the first participant;
   identifying, by the content selection component, a winning selection of the shared feature, the winning selection having a highest total number of votes after adjustment, wherein an indication of the winning selection is output;
   initiating, in the computer game, an instance of the shared online activity configured according to winning selection, the instance including the plurality of participants;
   automatically reducing, by the allotment management component, a respective voting allotment of each participant that voted for the winning selection by the number of votes of the respective participant before adjustment and by operation of one or more computer processors, without reducing a voting allotment of any participant that did not vote for the winning selection; and
   automatically increasing, by the allotment management component, the voting allotment of at least one of the plurality of participants upon determining that the at least one participant has successfully completed one or more specified tasks in the shared online activity configured according to the winning selection.

2. The computer-implemented method of claim 1, wherein the shared feature is selectable content presented to the participants of the shared online activity.

3. The computer-implemented method of claim 1, wherein the shared feature is a playable map, wherein the game comprises an online multi-player game.

4. The computer-implemented method of claim 1, further comprising adjusting the number of votes for at least one of the participants based on one or more user preferences and cached information associated with the at least one participant.

5. The computer-implemented method of claim 4, wherein the adjusted number of votes for the at least one participant i is $b_i s_i$, where $b_i$ is the number of votes received, and where $s_i$ is based on the user preferences and cached information.

6. The computer-implemented method of claim 4, wherein the cached information includes at least one of the voting allotment of the at least one participant, whether the at least one participant has previously voted on user-configurable features, and a credibility of the at least one participant.

7. A non-transitory computer-readable medium storing a computer game executable to perform an operation for voting on user-configurable features of a shared online activity, the operation comprising:
   receiving, from each of a plurality of participants, a distinct number of votes cast for a respective selection for a shared feature of the shared online activity, wherein the shared feature is user-configurable, wherein the shared online activity is provided via a virtual environment of the computer game, the computer game configured to execute on a server and including an allotment management component and a content selection component;

automatically adjusting, by the content selection component, the number of votes cast by at least a first one of the participants, based on one or more attributes of the first participant;

identifying, by the content selection component, a winning selection of the shared feature, the winning selection having a highest total number of votes after adjustment, wherein an indication of the winning selection is output;

initiating, in the computer game, an instance of the shared online activity configured according to winning selection, the instance including the plurality of participants;

automatically reducing, by the allotment management component, a respective voting allotment of each participant that voted for the winning selection by the number of votes received from the respective participant before adjustment and by operation of one or more computer processors when executing the computer game, without reducing a voting allotment of any participant that did not vote for the winning selection; and automatically increasing, by the allotment management component, the voting allotment of at least one of the plurality of participants upon determining that the at least one participant has successfully completed one or more specified tasks in the shared online activity configured according to the winning selection.

8. The non-transitory computer-readable medium of claim 7, wherein the shared feature is selectable content presented to the participants of the shared online activity.

9. The non-transitory computer-readable medium of claim 7, wherein the shared feature is a playable map, wherein the game comprises an online multi-player game.

10. The non-transitory computer-readable medium of claim 7, wherein the operation further comprises adjusting the number of votes for at least one of the participants based on one or more user preferences and cached information associated with the at least one participant.

11. The non-transitory computer-readable medium of claim 10, wherein the adjusted number of votes for the at least one participant i is $b_i s_i$, where $b_i$ is the number of votes received, and where $s_i$ is based on the user preferences and cached information.

12. The non-transitory computer-readable medium of claim 10, wherein the cached information includes at least one of the voting allotment of the at least one participant, whether the at least one participant has previously voted on user-configurable features, and a credibility of the at least one participant.

13. A system to vote on user-configurable features of a shared online activity, the system comprising:

one or more computer processors; and a memory storing a computer game which, when executed by the one or more computer processors, performs an operation comprising:

receiving, from each of a plurality of participants, a distinct number of votes cast for a selection for a shared feature of the shared online activity, wherein the shared feature is user-configurable, wherein the shared online activity is provided via a virtual environment of the computer game, the computer game executing on a server comprising the system, the computer game including an allotment management component and a content selection component;

automatically adjusting, by the content selection component, the number of votes cast by at least a first one of the participants, based on one or more attributes of the first participant;

identifying, by the content selection component, a winning selection of the shared feature, the winning selection having a highest total number of votes after adjustment, wherein an indication of the winning selection is output;

initiating, in the computer game, an instance of the shared online activity configured according to winning selection, the instance including the plurality of participants;

automatically reducing, by the allotment management component, a respective voting allotment of each participant that voted for the winning selection by the number of votes received from the respective participant before adjustment, without reducing a voting allotment of any participant that did not vote for the winning selection; and automatically increasing, by the allotment management component, the voting allotment of at least one of the plurality of participants upon determining that the at least one participant has successfully completed one or more specified tasks in the shared online activity configured according to the winning selection.

14. The system of claim 13, wherein the operation further comprises adjusting the number of votes for at least one of the participants based on one or more user preferences and cached information associated with the at least one participant.

15. The system of claim 14, wherein the adjusted number of votes for the at least one participant i is $b_i s_i$, where $b_i$ is the number of votes received, and where $s_i$ is based on the user preferences and cached information.

16. The computer-implemented method of claim 1, further comprising:

upon completion of the instance of the shared online activity, identifying a next winning selection of the shared feature, based on automatically adjusting a respective, next number of votes cast for the shared feature by each of the plurality of participants, wherein the next winning selection is different from the winning selection;

wherein each of the one or more attributes is selected from participant credibility, participant total play time, time since participant login, whether the first participant achieved victory in a previous activity, whether a previous vote of the first participant was for a winning selection, and whether a previous vote of the first participant was for a losing selection;

wherein in identifying the winning selection of the user-configurable feature, the adjusted number of votes for the first participant is considered instead of the number of votes received from the first participant.

17. The computer-implemented method of claim 16, further comprising independently increasing the voting allotment of a given participant upon each of:

(i) a game client of the given participant connecting to a game server of the computer game;

(ii) the given participant playing the computer game for a specified amount of time;

(iii) the given participant completing the shared online activity; and (iv) the given participant purchasing, using real-world currency, a voting allotment increase.

18. The computer-implemented method of claim 17, wherein the adjusted number of votes for the participant i is $b_i s_i$, wherein $b_i$ is the number of votes received, wherein $s_i$ is based on user preferences and cached information, wherein the shared feature is a playable map, wherein the game comprises an online multi-player game.

19. The computer-implemented method of claim 18, wherein the cached information includes: (i) the voting allotment of the first participant; (ii) whether the first participant has previously bid on user-configurable features; (iii) the participant credibility, which is associated with the first participant; (iv) whether the first participant achieved victory in a previous activity; and (v) the participant total play time, which is associated with the first participant;

wherein the number of votes cast by the first participant is adjusted based on the participant credibility, the participant total play time, the time since participant login, whether the first participant achieved victory when participating in the previous activity, whether a previous vote of the first participant was for a winning selection, and whether a previous vote of the first participant was for a losing selection.

20. The computer-implemented method of claim 19, further comprising:

reducing an incidence of any given participant repeatedly being denied a desired selection of the shared feature of the shared online activity due to voting allotment reductions resulting from the desired selection repeatedly being a non-winning selection, wherein reducing the incidence comprises automatically reducing the respective voting allotment of each participant that voted for the winning selection;

wherein the desired selection of the shared feature that is repeatedly denied comprises, in respective instances: (i) the same shared feature each time and (ii) a different shared feature each time.

* * * * *